US009794426B2

United States Patent
Kurihara

(10) Patent No.: US 9,794,426 B2
(45) Date of Patent: Oct. 17, 2017

(54) MOBILE TERMINAL, CONTROL METHOD FOR MOBILE TERMINAL, AND STORAGE MEDIUM FOR COMMUNICATING WITH AN IMAGE PROCESSING APPARATUS

(71) Applicant: CANON KABUSHIKI KAISHA, Tokyo (JP)

(72) Inventor: Shukei Kurihara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/179,604

(22) Filed: Jun. 10, 2016

(65) Prior Publication Data

US 2016/0373594 A1    Dec. 22, 2016

(30) Foreign Application Priority Data

Jun. 17, 2015   (JP) .................. 2015-122021

(51) Int. Cl.
| | | |
|---|---|---|
| *G06F 15/00* | (2006.01) | |
| *G06F 3/12* | (2006.01) | |
| *G06K 1/00* | (2006.01) | |
| *H04N 1/00* | (2006.01) | |
| *H04N 1/44* | (2006.01) | |

(52) U.S. Cl.
CPC ..... *H04N 1/00103* (2013.01); *H04N 1/00411* (2013.01); *H04N 1/00493* (2013.01); *H04N 1/4413* (2013.01); *H04N 2201/0041* (2013.01); *H04N 2201/0094* (2013.01); *H04N 2201/0096* (2013.01)

(58) Field of Classification Search
CPC .......... H04N 1/00108; H04N 1/00411; H04N 1/00493; H04N 1/4413; H04N 2201/0041; H04N 2201/0094; H04N 2201/0096
USPC .............................. 358/1.1, 1.15, 1.13, 1.14
See application file for complete search history.

(56) References Cited

U.S. PATENT DOCUMENTS

| | | | | |
|---|---|---|---|---|
| 2015/0038086 A1* | 2/2015 | Kim | ...................... | H04W 4/008 455/41.3 |
| 2015/0382304 A1* | 12/2015 | Park | .................. | H04W 52/0248 455/41.2 |
| 2016/0182762 A1* | 6/2016 | Eum | .................... | H04N 1/4413 358/1.14 |

FOREIGN PATENT DOCUMENTS

JP    2013-183215 A    9/2013

* cited by examiner

*Primary Examiner* — Douglas Tran
(74) *Attorney, Agent, or Firm* — Canon U.S.A., Inc. IP Division

(57) ABSTRACT

A mobile terminal that communicates with an image processing apparatus including a scanning function includes a display unit that displays a screen, a first instruction unit that, when the display unit displays a specific screen corresponding to the scanning function, instructs the image processing apparatus to activate a specific application corresponding to the scanning function, and a second instruction unit that, when the mobile terminal receives an instruction to perform the scanning function, instructs the image processing apparatus to perform the scanning function.

7 Claims, 12 Drawing Sheets

MOBILE TERMINAL, CONTROL METHOD FOR MOBILE TERMINAL, AND STORAGE MEDIUM FOR COMMUNICATING WITH AN IMAGE PROCESSING APPARATUS

BACKGROUND

Field

Aspects of the present invention generally relate to a mobile terminal, a control method for a mobile terminal, and a storage medium.

Description of the Related Art

In recent years, some information processing apparatuses have been providing services using short-range wireless communication, such as Near Field Communication (NFC).

Office automation (OA) equipment, household electrical appliance, or other electrical equipment equipped with the short-range wireless communication function are able to determine an approximate distance based on, for example, a radio field intensity using Bluetooth® Low Energy (BLE).

Furthermore, there is also an application (application software) installed on a mobile terminal apparatus and capable of operating an image processing apparatus and instructing the image processing apparatus to perform scanning or other operation. Japanese Patent Application Laid-Open No. 2013-183215 discusses an application installed on a mobile terminal apparatus, which is capable of, when an image processing apparatus is located near the mobile terminal apparatus, logging into the image processing apparatus to enable performing scanning.

SUMMARY

According to an aspect of the present invention, a mobile terminal that communicates with an image processing apparatus including a scanning function includes a display unit configured to display a screen, a first instruction unit configured to, when the display unit displays a specific screen corresponding to the scanning function, instruct the image processing apparatus to activate a specific application corresponding to the scanning function, and a second instruction unit configured to, when the mobile terminal has received an instruction to perform the scanning function, instruct the image processing apparatus to perform the scanning function.

Further features of aspects of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
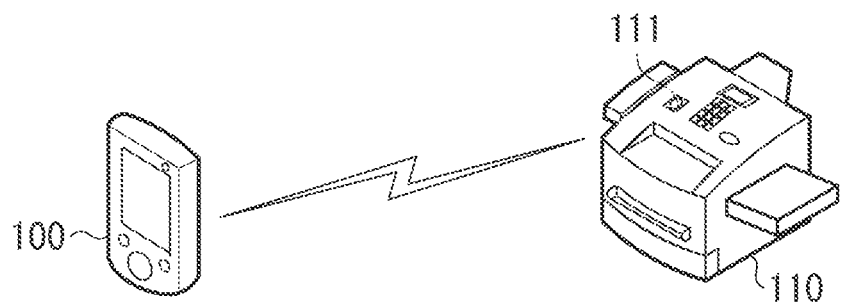
FIG. 1 illustrates an example of a system configuration of a communication system.

A system configuration of a communication system according to an exemplary embodiment is described with reference to FIG. 1. The communication system includes a mobile terminal 100, a multifunction peripheral (MFP) 110, and a Bluetooth® communication unit 111, which is mounted on the MFP 110. The MFP 110, which acts as an access point in terms of software, performs wireless communication, such as wireless communication local area network (LAN), with the mobile terminal 100.

The mobile terminal 100 is capable of performing wireless communication, such as wireless communication LAN. When receiving a beacon signal transmitted from the Bluetooth® communication unit 111, the mobile terminal 100 determines, based on the radio field intensity of the beacon signal, whether the Bluetooth® communication unit 111 (MFP 110) is located within a predetermined range (in other words, located in the vicinity). If it is determined that the MFP 110 is located in the vicinity, the mobile terminal 100 transmits user information to the MFP 110 using Bluetooth® Low Energy (BLE).

The MFP 110 authenticates the user information, performs user login processing, and enables an access point function. The mobile terminal 100 connects to the MFP 110 by enabling the wireless communication LAN. In response to a user operation, the mobile terminal 100 shifts the displayed screen to a scan screen and then transmits screen information indicating the scan screen to the MFP 110. In response to the screen information, the MFP 110 activates an application stored in a hard disk drive (HDD). Furthermore, the mobile terminal 100 transmits a scan job to the MFP 110 via the wireless communication LAN, thus issuing an instruction to perform scanning. The MFP 110, upon receipt of the scan job, performs scanning and then transmits the scanned data to the mobile terminal 100. The mobile terminal 100 is an example of a mobile terminal apparatus. The MFP 110 is an example of an image processing apparatus.

Figure 2:
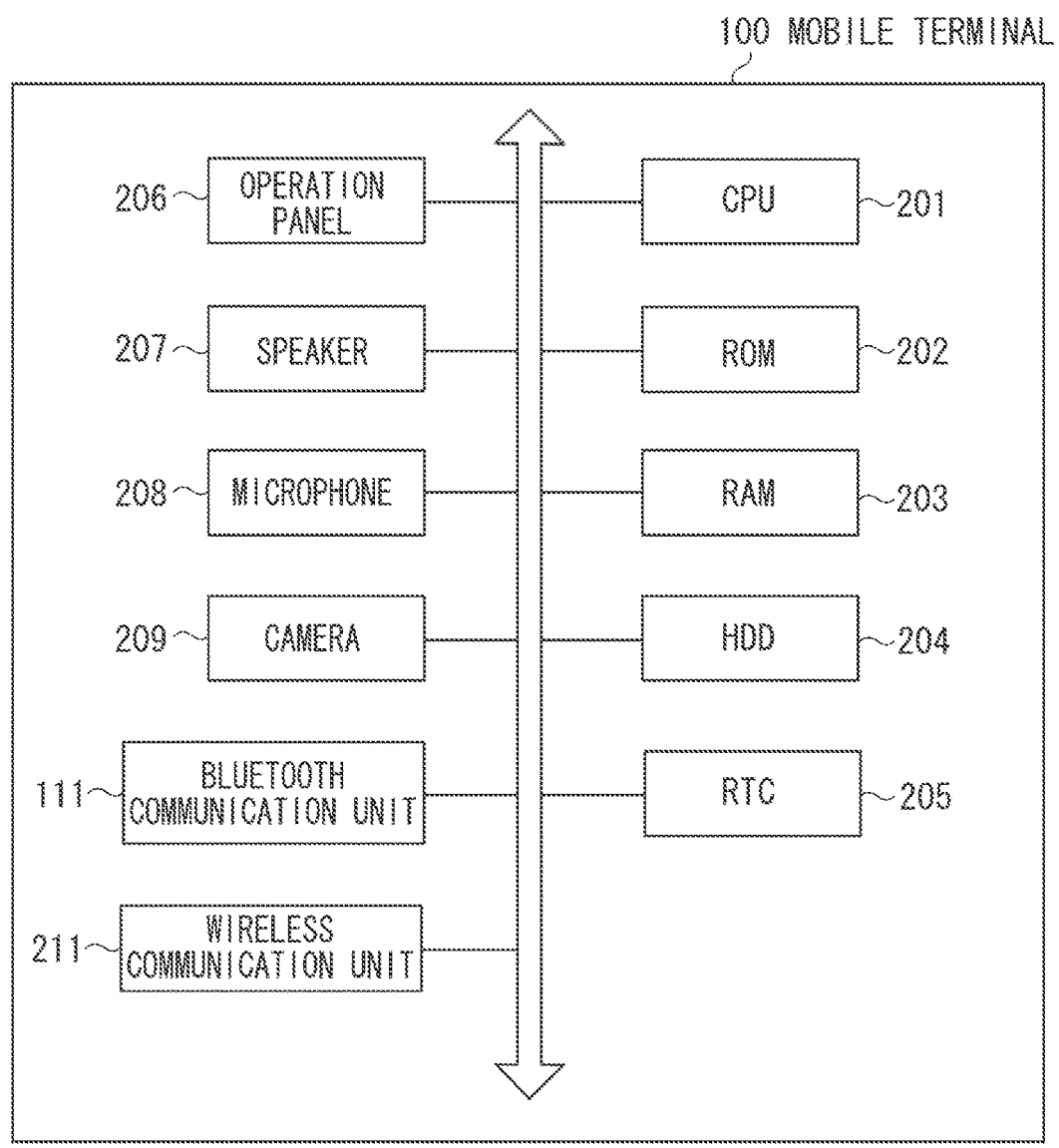
FIG. 2 illustrates an example of a hardware configuration of a mobile terminal.

Next, a hardware configuration of the mobile terminal 100 is described with reference to FIG. 2. The mobile terminal 100 according to the present exemplary embodiment is assumed to be an apparatus such as a smartphone or a tablet personal computer (PC), but can be any type of apparatus that is an information processing apparatus capable of performing wireless communication.

A central processing unit (CPU) 201 implements a software configuration of the mobile terminal 100 and processing illustrated in a flowchart for the mobile terminal 100, which are described below, by reading out a program stored in, for example, a read-only memory (ROM) 202 or an HDD 204 and performing processing based on the program. The ROM 202 stores programs and data. A random access memory (RAM) 203 is used as a temporary storage region, such as a main memory or a work area for the CPU 201. The HDD 204 stores various pieces of data, such as photographs and electronic documents. Furthermore, an operating system (OS) 311 and a program for an MFP application 300, which are described later below, are also stored in the HDD 204. A real-time clock (RTC) 205 keeps track of the current time.

While in the present exemplary embodiment a single CPU 201 performs processing based on a program to perform each processing illustrated in the below described flowchart for the mobile terminal 100 another form of operation can be employed. For example, a plurality of CPUs can perform processing based on a program to perform, in cooperation, each processing illustrated in the below described flowchart for the mobile terminal 100.

An operation panel 206 includes a touch panel function, which is capable of detecting a touch operation of the user, and displays various types of screens provided by the OS 311 or the MFP application 300. The user can input a desired operation instruction to the mobile terminal 100 by inputting a touch operation to the operation panel 206.

A speaker 207 and a microphone 208 are used for the user to call another mobile terminal or a fixed-line phone. A camera 209 captures an image in response to a user's image shooting instruction. A photograph taken by the camera 209 is stored in a predetermined region of the HDD 204, A Bluetooth® communication unit 210 is an interface for performing wireless communication according to the Bluetooth® standard. The Bluetooth® communication unit 210 mutually communicates with another apparatus having a Bluetooth® interface (I/F). In the present exemplary embodiment, the mobile terminal 100 performs mutual communication with the MFP 110 according to the Bluetooth® standard. Furthermore, the short-range wireless communication performed by the Bluetooth® communication unit 210 is not limited to Bluetooth®.

A wireless communication unit 211 performs wireless communication, such as wireless communication LAN.

Figure 3:
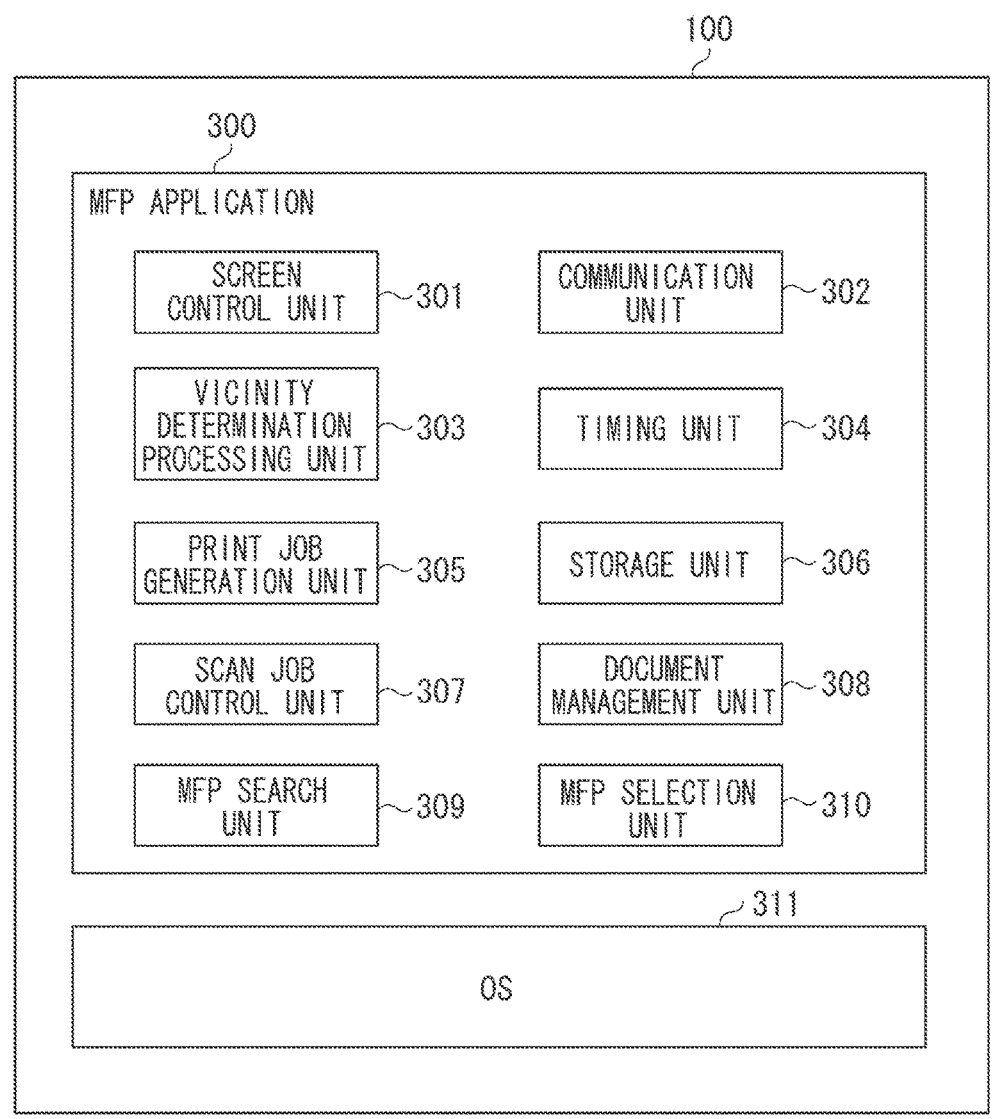
FIG. 3 illustrates an example of a software configuration of the mobile terminal.

Next, a software configuration of the mobile terminal 100 is described with reference to FIG. 3.

The OS 311 controls the operation of the entire mobile terminal 100. The mobile terminal 100 allows various applications, including the MFP application 300, which is described below, to be installed thereon. The OS 311 exchanges information with these applications, and, according to an instruction received from each application, changes a screen to be displayed on the operation panel 206 or performs wireless communication via the wireless communication unit 211.

The MFP application 300 is an application installed on the mobile terminal 100. The MFP application 300 is able to cause the MFP 110 to perform an operation, such as printing or scanning. The mobile terminal 100 has, in addition to the MFP application 300, various applications installed thereon, the description of which is omitted herein.

A software configuration of the MFP application 300 is described in more detail. A screen control unit 301 controls, via the OS 311, a screen to be displayed on the operation panel 206. An MFP application screen is displayed on the operation panel 206 by the screen control unit 301. Furthermore, the screen control unit 301 determines an operation instruction input by the user via the operation panel 206. A communication unit 302 controls, via the OS 311, short-range wireless communication performed by the Bluetooth® communication unit 210 and wireless communication performed by the wireless communication unit 211.

A vicinity determination processing unit 303 determines whether the mobile terminal 100 is present in the vicinity (within a predetermined range) of the MFP 110 based on radio field intensity information of a beacon signal received by the Bluetooth® communication unit 210. If it is determined that the mobile terminal 100 is present in the vicinity of the MFP 110, the vicinity determination processing unit 303 transmits user information to the MFP 110.

A print job generation unit 305 generates a print job. The print job generated by the print job generation unit 305 is transmitted by the wireless communication unit 211 to the MFP 110, which prints the print job.

A storage unit 306 temporarily stores various pieces of information in, for example, the RAM 203 or the HDD 204. When a scan setting screen is displayed by the screen control unit 301, a scan job control unit 307 instructs the MFP 110 to activate a scanning application. The scan job control unit 307 causes the wireless communication unit 211 to instruct the MFP 110 to perform scanning, and then displays scanned data received from the MFP 110. Scanned data to be retained is stored in the storage unit 306. The stored scanned data is managed by a document management unit 308.

An MFP search unit 309 transmits, via the wireless communication unit 211, a search command onto a network, and then lists found MFPs based on the received response data. An MFP selection unit 310 selects an MFP that is to be operated from among the list of found MFPs, and stores information indicating the selected MFP in the storage unit 306. The MFP selection unit 310 also stores a list of previously selected MFPs. A timing unit 304 keeps track of the current time based on the RTC 205.

Figure 4:
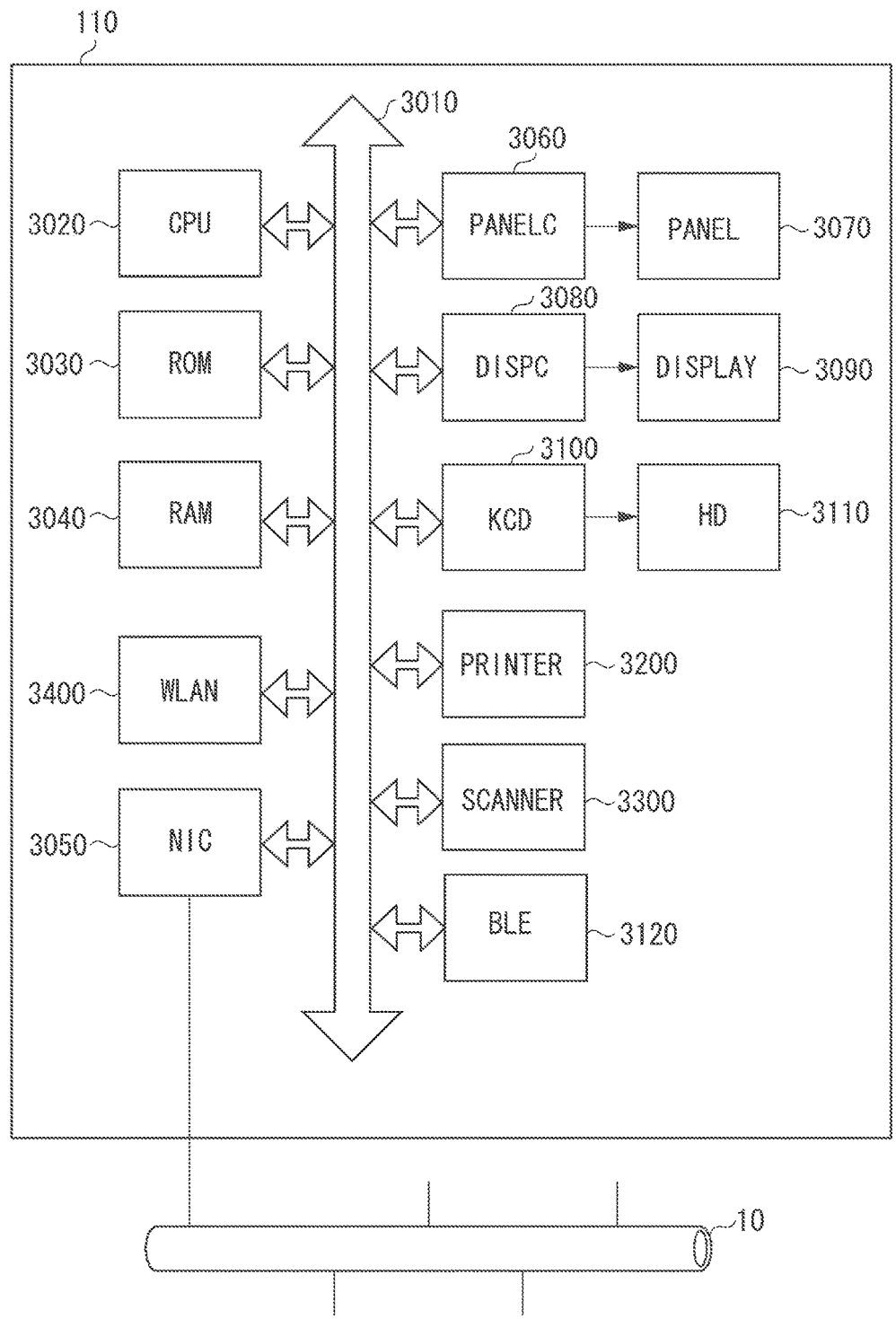
FIG. 4 illustrates an example of a hardware configuration of a multifunction peripheral (MFP).

FIG. 4 illustrates an example of a hardware configuration of the MFP 110.

The MFP 110 includes a CPU 3020, which executes programs stored in, for example, a ROM 3030 or a hard disk (HD) 3110. The CPU 3020 comprehensively controls each device connected to a system bus 3010. A software configuration of the MFP 110 and processing illustrated in a flowchart for the MFP 110, which are described below, are implemented by the CPU 3020 performing processing based on the programs.

A RAM 3040 functions as, for example, a main memory or a work area for the CPU 3020. An external input controller (PANELC) 3060 controls instructions input from, for example, various buttons, which are provided on the MFP 110, or a touch panel (PANEL) 3070. A display controller (DISPC) 3080 controls a displaying operation of a display module (DISPLAY) 3090, which is composed of, for example, a liquid crystal display. A disk controller (DKC) 3100 controls the HD 3110.

A network interface card (NIC) 3050 bi-directionally exchanges data with, for example, another network device or a file server via a network 10. A wireless communication module (WLAN) 3400 controls wireless communication. The MFP 110 operates as an access point, and is able to directly connect by wireless communication to the mobile terminal 100 via the wireless communication module 3400. A printer (PRINTER) 3200 is a printing unit for printing on paper via an electrophotographic method. The printing method is not necessarily the electrophotographic method.

A scanner (SCANNER) 3300 is an image reading unit that reads an image printed on paper. The image reading unit 3300 is optionally equipped with an automatic document feeder (ADF) and is thus able to automatically read a plurality of documents.

Furthermore, in some cases, the HD 3110 can be used as a temporary storage location for images.

A Bluetooth® I/F (BLE) 3120 is an interface for performing wireless communication using the Bluetooth® standard. The Bluetooth® I/F 3120 mutually communicates with another device having a Bluetooth® I/F. In the present exemplary embodiment, the MFP 110 mutually communicates with the mobile terminal 100 using the Bluetooth® standard.

Figure 5:
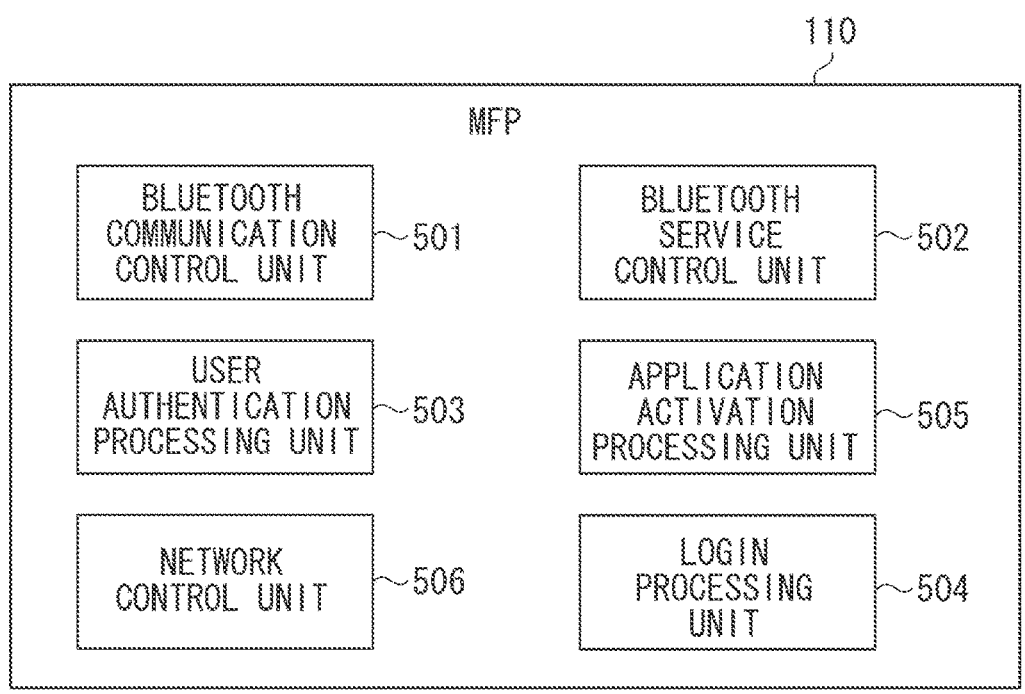
FIG. 5 illustrates an example of a software configuration of the MFP.

FIG. 5 illustrates an example of a software configuration of the MFP 110.

A Bluetooth® communication control unit 501 is a device driver that controls the Bluetooth® I/F 3120, and thus controls data communication with the mobile terminal 100. Data received via the Bluetooth® communication control unit 501 is passed to a Bluetooth® service control unit 502 and is then processed there.

The Bluetooth® service control unit 502 executes an instruction for starting processing performed by a user authentication processing unit 503, a login processing unit 504, and an application activation processing unit 505.

The user authentication processing unit 503 receives user information from the Bluetooth® service control unit 502 and performs authentication processing based on the user information. The login processing unit 504 performs login processing using the user information used for authentication by the user authentication processing unit 503. The application activation processing unit 505 receives screen information from the Bluetooth® service control unit 502, and activates, executes, or terminates an application, such as a scanning application.

A network control unit 506 executes an access point function according to an instruction from the Bluetooth® service control unit 502.

Figure 6:
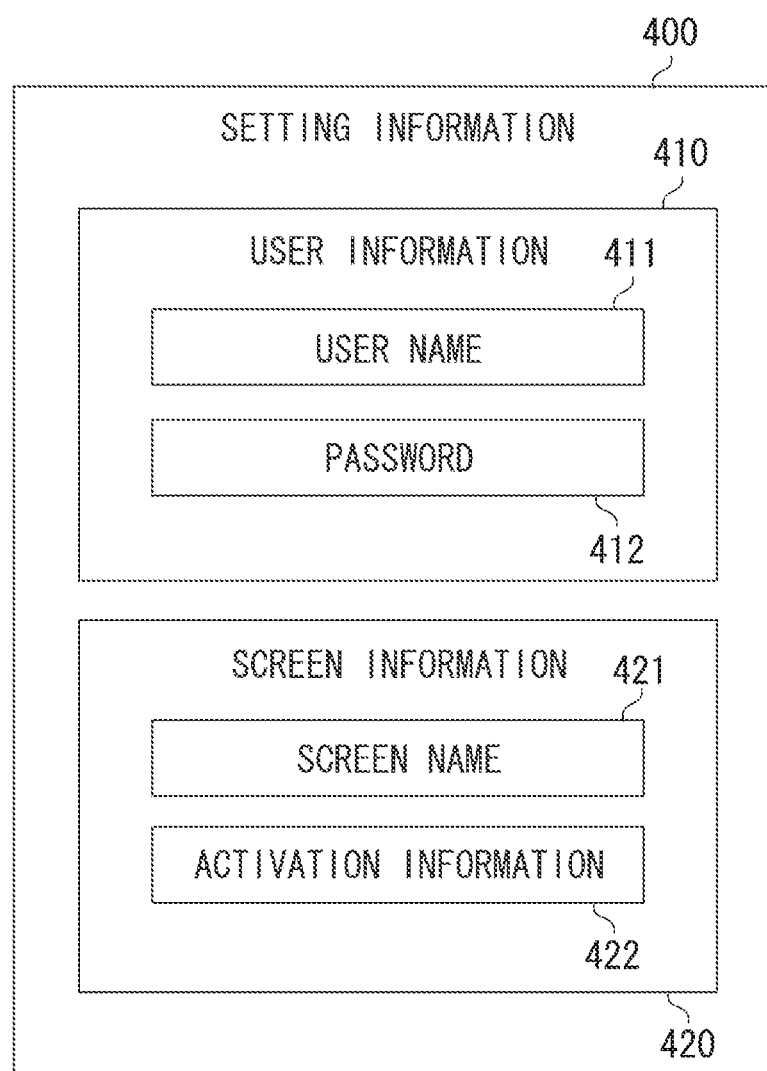
FIG. 6 illustrates an example of a Bluetooth service that the MFP has.

FIG. 6 illustrates an example of a Bluetooth® service that the MFP 110 has. The MFP 110, according to the present exemplary embodiment, releases setting information 400 defined by the Generic Attribute Profile (GATT profile) to Bluetooth®-connected mobile terminals. Examples of the GATT profile defining the released setting information 400 include user information 410 and screen information 420.

The user information 410 includes the following characteristics:
User name 411, which is a user name used for logging into the MFP 110, and
Password 412, which is a password used for logging into the MFP 110.

Furthermore, the screen information 420 includes the following characteristics:
Screen name 421, which is a screen name transmitted to the MFP 110, and
Activation information 422, which is information indicating whether to instruct the MFP 110 to activate or terminate an application associated with the screen name 421. Moreover, in a case where only login is performed, the MFP 110 does not need to receive the screen information 420.

The GATT profile is merely an example, and, in some cases, the setting information 400 also includes a device identifier for identifying a device.

Next, information processing performed by the mobile terminal 100 is described with reference to the flowchart of FIG. 7. In step S601, in response to a user operation performed via, for example, the operation panel 206, the CPU 201 activates the MFP application 300 and displays, on the operation panel 206, a screen illustrated in FIG. 8.

In step S602, the CPU 201 determines whether a beacon signal for BLE has been detected. If it is detected that the beacon signal has been detected (YES in step S601), the processing proceeds to step S603. Otherwise (NO in step S602) the processing returns to step S602.

In step S603, the CPU 201 analyzes the received beacon signal and determines whether radio field intensity information indicates a predetermined threshold value or more. The beacon signal includes at least radio field intensity information and device information. The CPU 201 can determine that an MFP is present in the vicinity in a case where the radio field intensity indicated by the radio field intensity information included in the beacon signal is greater than or equal to the predetermined threshold value.

Figure 9:
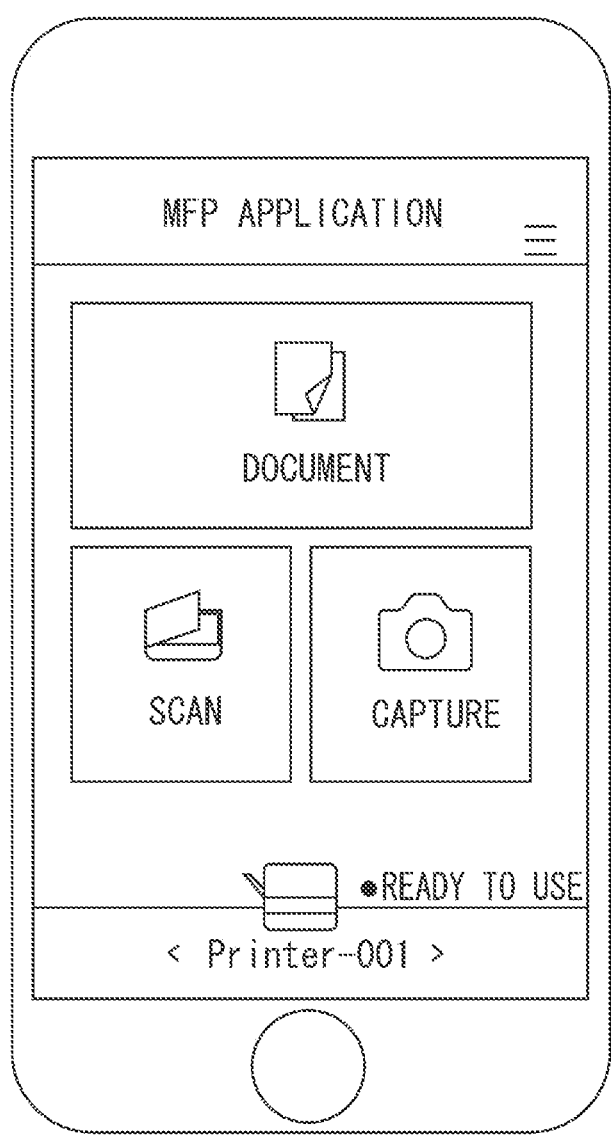
FIG. 9 illustrates an example of a screen displayed when a device has been selected.

In step S604, the CPU 201 selects a device based on the device information included in the received beacon signal, and displays, on the operation panel 206, a screen in which the selected device is displayed, such as a screen illustrated in FIG. 9. In the illustration of FIG. 9, a reduced image of the selected device is displayed in the screen.

In step S605, the CPU 201 performs GATT communication negotiation by BLE, thus establishing communication.

In step S606, the CPU 201 transmits user information to the MFP 110. More specifically, the CPU 201 performs writing of the setting information 400 using the GATT communication.

In step S607, the CPU 201 receives a notification of the attribute (ATT) and determines whether login is successful based on the received notification. If it is detected by the CPU 201 that login is successful (YES in step S607), the processing proceeds to step S608. Otherwise (NO in step S607) the processing illustrated in the flowchart of FIG. 7 ends.

In step S608, the CPU 201 turns wireless communication on and performs connection to an MFP, an access point of which is enabled. If there is an MFP to which the mobile terminal 100 previously connected, the CPU 201 performs connection to the MFP without requiring the entry of a passkey.

Figure 10:
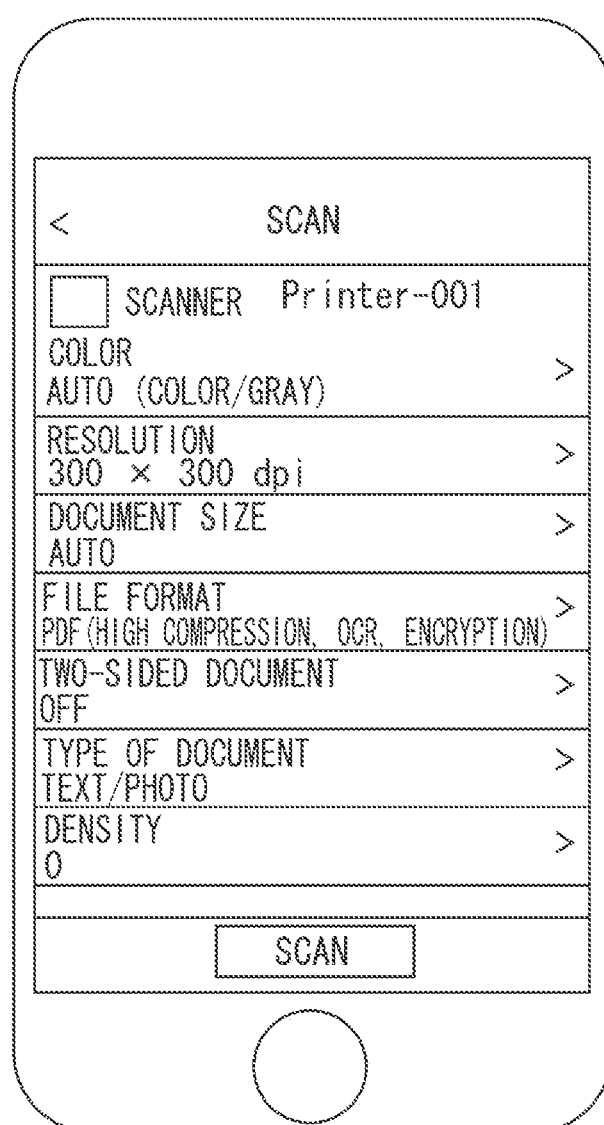
FIG. 10 illustrates an example of a scan setting screen.

In step S609, when the user selects a scanning function, the CPU 201 shifts the screen to a scan setting screen illustrated in FIG. 10.

In step S610, the CPU 201 sets "scan screen" to the screen name 421 and performs writing of the setting information 400, thus instructing the MFP 110 to activate an application associated with scanning.

In step S611, the CPU 201 determines whether scanning is to be performed, according to whether a scan execution button has been pressed in the scan setting screen. If it is determined by the CPU 201 that scanning is to be performed according to the scan execution button having been pressed (YES in step S611), the processing proceeds to step S612. Otherwise (NO in step S611) the processing repeats step S611.

In step S612, the CPU 201 instructs, via wireless communication, the MFP 110 to perform scanning.

In step S613, the CPU 201 receives scanned data from the MFP 110 and then previews the scanned data. Then, the processing proceeds to step S614.

In step S614, the CPU 201 sets "end" to the activation information 422 and performs writing of the setting information 400, thus performing GATT communication disconnection processing.

Figure 7:
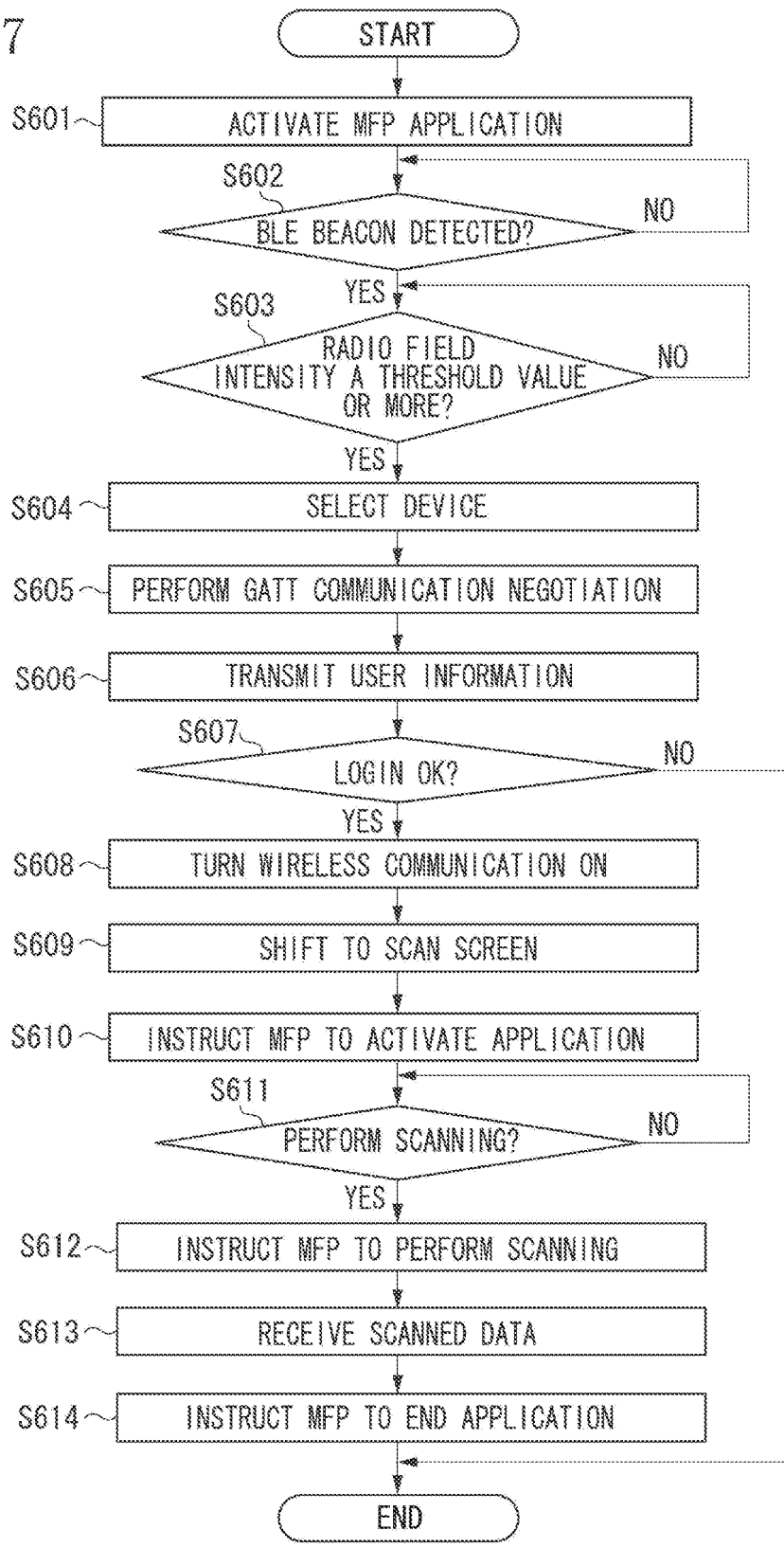
FIG. 7 is a flowchart illustrating an example of information processing performed by the mobile terminal.
Figure 8:
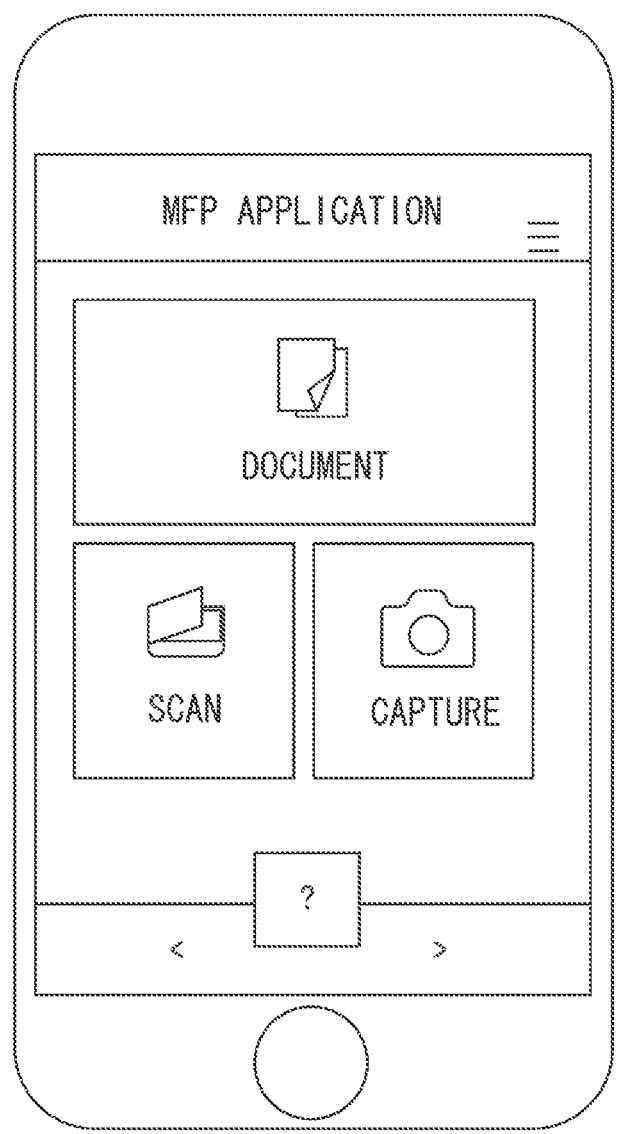
FIG. 8 illustrates an example of a screen for an MFP application.

Then, the CPU 201 ends the processing illustrated in the flowchart of FIG. 7.

In the description of the present exemplary embodiment, the CPU 201 individually performs the login processing in step S606 and the scan instruction in step S610. However, when performing the processing in step S606, the CPU 201 can also perform the processing in step S610 at the same time.

Figure 11:
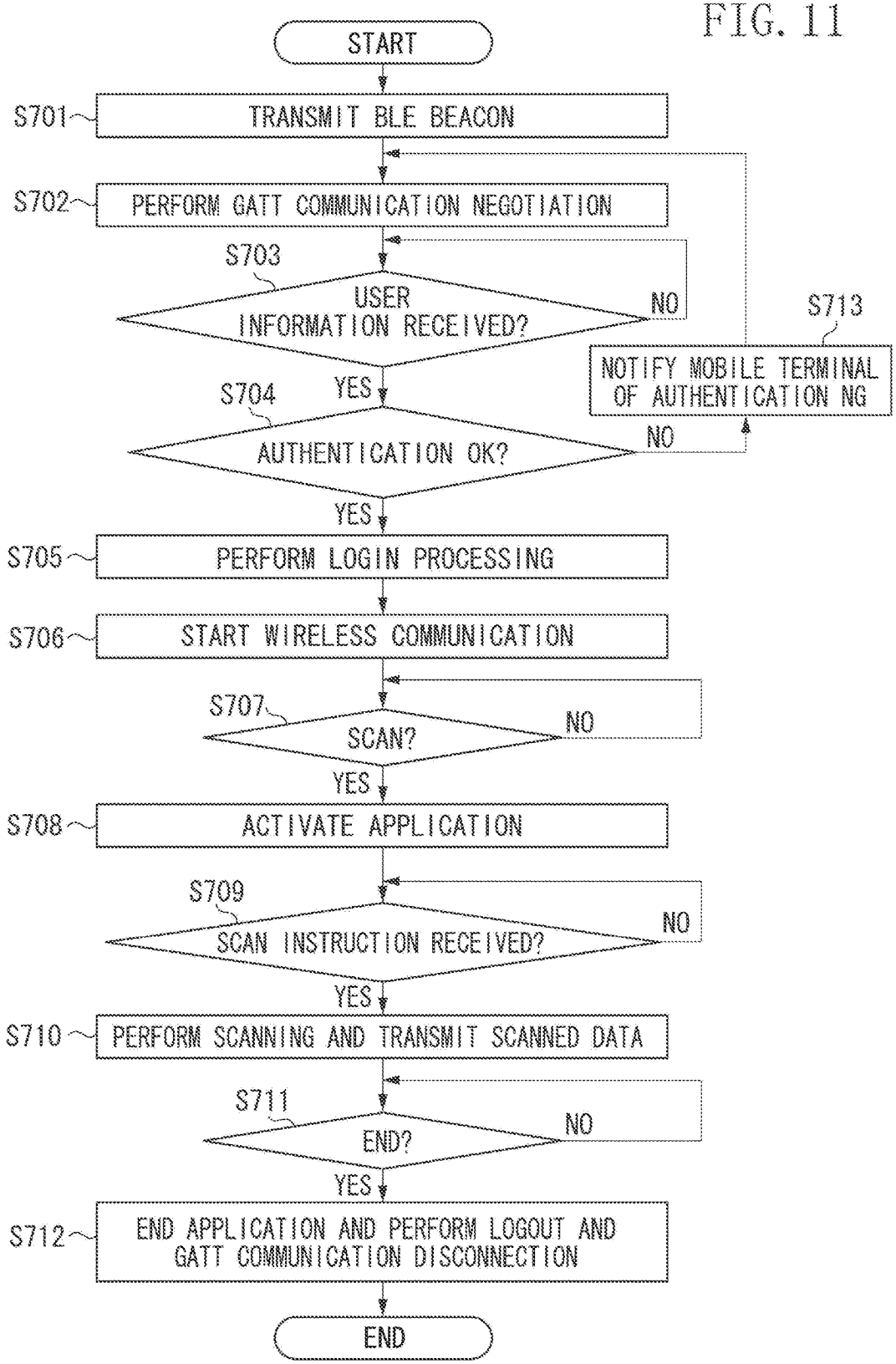
FIG. 11 is a flowchart illustrating an example of information processing performed by the MFP.
Figure 12:
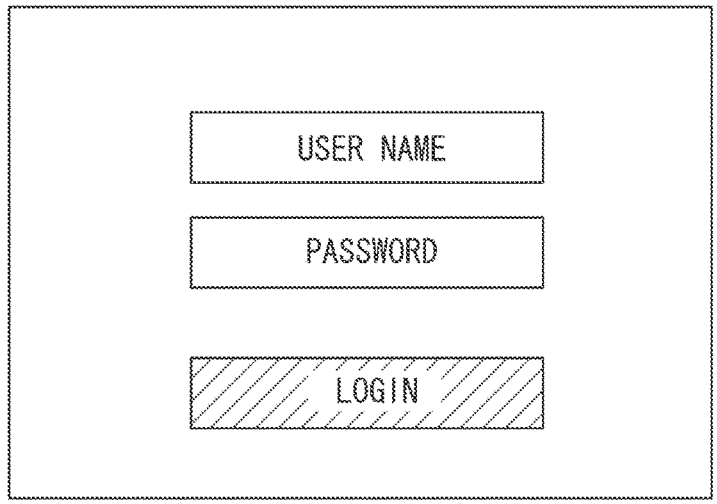
FIG. 12 illustrates an example of a screen for login.

Next, information processing performed by the MFP 110 is described with reference to the flowchart of FIG. 11. The CPU 3020 is displaying, on the touch panel 3070, a screen for login such as that illustrated in FIG. 12.

In step S701, the CPU 3020 starts periodic transmission of an advertisement packet as a Bluetooth® beacon signal.

In step S702, the CPU 3020 performs GATT communication negotiation, thus establishing communication.

In step S703, the CPU 3020 determines whether the setting information 400 has been received via GATT communication from the mobile terminal 100. If it is determined that the setting information 400 has been received (YES in step S703), the processing proceeds to step S704. Otherwise (NO in step S703) the processing returns to step S703.

In step S704, the CPU 3020 performs authentication processing on the user information 410 of the setting information 400. If the authentication processing is successful (OK) (YES in step S704), the processing proceeds to step S705. Otherwise (NO in step S704) the processing proceeds to step S713.

Figure 13:
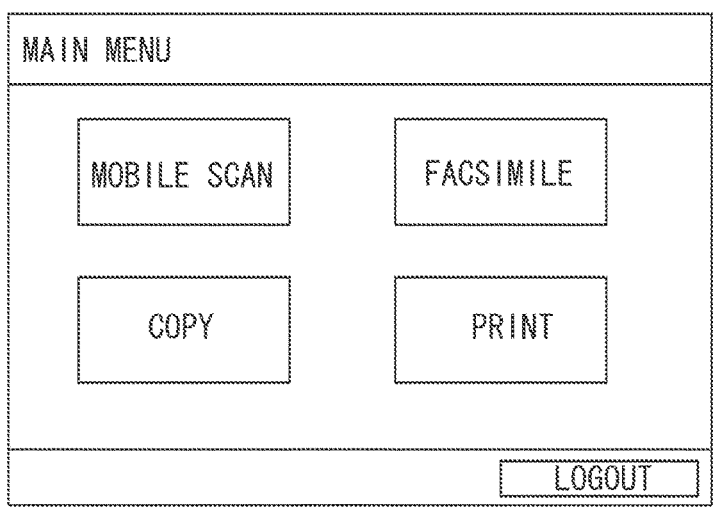
FIG. 13 illustrates an example of a menu screen.

In step S705, the CPU 3020 performs login processing, and displays a menu screen illustrated in FIG. 13 on the touch panel 3070. Then, the processing proceeds to step S706.

In step S713, the CPU 3020 notifies the mobile terminal 100 of the failure (NG) of authentication. Then, the processing returns to step S702.

In step S706, the CPU 3020 starts wireless communication. Then, the processing proceeds to step S707.

In step S707, the CPU 3020 determines whether the setting information 400 has been received via GATT communication. If it is determined that the screen name 421 of the setting information 400 is "scan" (YES in step S707), the processing proceeds to step S708. Otherwise (NO in step S707) the processing returns to step S707.

Figure 14:
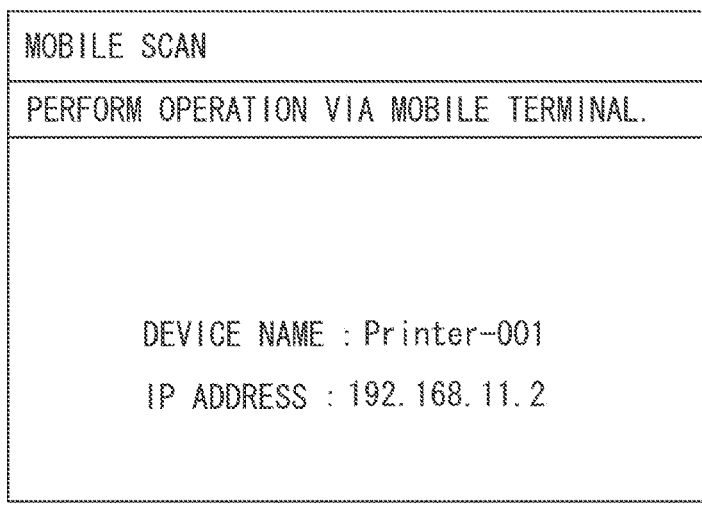
FIG. 14 illustrates an example of a screen that prompts a user to perform an operation via the mobile terminal.

In step S708, the CPU 3020 activates a scanning application, displays a screen illustrated in FIG. 14 on the touch panel 3070, and enters a scan execution command waiting state.

In step S709, the CPU 3020 determines whether the scan instruction has been received via wireless communication. If it is determined that the scan instruction has been received (YES in step S709), the processing proceeds to step S710. Otherwise (NO in step S709) the processing returns to step S709. In step S710, the CPU 3020 performs scanning and then transmits scanned data to the mobile terminal 100 via wireless communication.

In step S711, the CPU 3020 determines whether the setting information 400 has been received using GATT communication. If it is determined that "end" is set to the activation information 422 of the received setting information 400 (YES in step S711), the processing proceeds to step S712. Otherwise (NO in step S711) the processing returns to step S711.

In step S712, the CPU 3020 ends the activated scanning application, and further performs GATT communication disconnection and logout processing. Then, the processing illustrated in the flowchart of FIG. 11 ends. The CPU 3020 can end the scanning application after the elapse of a predetermined time after the scanning processing is ended.

While the present exemplary embodiment describes the case of using a scanning function, the function that an MFP provides is not limited to the scanning function.

(Advantageous Effect)

As described above, as long as the mobile terminal 100 is present in the vicinity of the MFP 110, the MFP 110 is automatically selected as a device, and an application installed on the MFP 110 can be activated via the mobile terminal 100. Accordingly, the user can easily and smoothly use, for example, a scanning function by simply performing an operation on the mobile terminal 100, without performing an operation on the MFP 110.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-122021 filed Jun. 17, 2015, which is hereby incorporated by reference herein in its entirety.

What is claimed is:

1. A mobile terminal comprising:
a memory device that stores programs; and
a processor that executes the programs to:
determine, in a case of receiving a beacon signal for BLE (Bluetooth Low Energy) by the mobile terminal from an image processing apparatus, whether radio field intensity of the beacon signal is not less than a threshold value;
upon determination that the radio field intensity is not less than the threshold value, automatically transmit user information for login of the image processing apparatus to the image processing apparatus via GATT (Generic Attribute Profile) communication by BLE; and
transmit an execution instruction for scan processing to the image processing apparatus via wireless LAN communication in response to a scan instruction received by the mobile terminal from a user after the login of the image processing apparatus.

2. The mobile terminal according to claim 1, wherein the mobile terminal receives scan data generated by executing the scan processing by the image processing apparatus from the image processing apparatus via the wireless LAN communication.

3. The mobile terminal according to claim 1, wherein, upon the login of the image processing apparatus, the mobile terminal establishes a wireless connection for the wireless LAN communication to the image processing apparatus.

4. A control method for a mobile terminal, the control method comprising:
   determining, in a case of receiving a beacon signal for BLE (Bluetooth Low Energy) by the mobile terminal from an image processing apparatus, whether radio field intensity of the beacon signal is not less than a threshold value;
   upon determining that the radio field intensity is not less than the threshold value, automatically transmitting user information for login of the image processing apparatus to the image processing apparatus via GATT (Generic Attribute Profile) communication by BLE; and
   transmitting an execution instruction for scan processing to the image processing apparatus via wireless LAN communication in response to a scan instruction received by the mobile terminal from a user after the login of the image processing apparatus.

5. The control method according to claim 4, further comprising receiving, at the mobile terminal from the image processing apparatus via the wireless LAN communication, scan data generated by executing the scan processing by the image processing apparatus.

6. The control method according to claim 4, wherein, upon the login of the image processing apparatus, the mobile terminal establishes a wireless connection for the wireless LAN communication to the image processing apparatus.

7. A non-transitory computer-readable storage medium storing computer executable instructions that, when executed by a computer, cause the computer to perform a control method for a mobile terminal, the control method comprising:
   determining, in a case of receiving a beacon signal for BLE (Bluetooth Low Energy) by the mobile terminal from an image processing apparatus, whether radio field intensity of the beacon signal is not less than a threshold value;
   upon determining that the radio field intensity is not less than the threshold value, automatically transmitting user information for login of the image processing apparatus to the image processing apparatus via GATT (Generic Attribute Profile) communication by BLE; and
   transmitting an execution instruction for scan processing to the image processing apparatus via wireless LAN communication in response to a scan instruction received by the mobile terminal from a user after the login of the image processing apparatus.

* * * * *